United States Patent Office 3,547,793
Patented Dec. 15, 1970

3,547,793
RADIATION POLYMERIZATION OF COMPACTED TRIOXANE
Nelson Samuel Marans, Silver Spring, Md., and Fern Wood Mitchell, Washington, D.C., assignors to W. R. Grace & Co., New York, N.Y., a corporation of Connecticut
No Drawing. Continuation-in-part of application Ser. No. 466,438, June 23, 1965, which is a continuation-in-part of application Ser. No. 198,472, May 29, 1962. This application June 5, 1968, Ser. No. 734,514
Int. Cl. C08d 1/00
U.S. Cl. 204—159.21                                      8 Claims

ABSTRACT OF THE DISCLOSURE

In abstract this invention is directed to a process for preparing a high molecular weight polyoxymethylene polymer comprising; (a) compacting trioxane in the solid state; (b) irradiating the compacted trioxane; (c) polymerizing the irradiated trioxane; (d) separating the resulting polyoxymethylene polymer from non-polymerized trioxane; and (e) recovering the separated polymer.

---

This is a continuation-in-part of our copending application Ser. No. 466,438, filed June 23, 1965 and now pending, which is in turn a continuation-in-part of our application of Ser. No. 198,472, filed May 29, 1962 and now abandoned.

The present invention relates to irradiation produced high molecular weight polyoxymethylene polymers, and more specifically to an improved method for obtaining polyoxymethylene polymers of consistently high quality by the irradiation of trioxane.

Methods for polymerizing trioxane are taught by U.S. Pat. Nos. 3,242,063 and 2,947,727. U.S. Pat. No. 3,027,352 teaches methods for preparing copolymers of trioxane, and U.S. Pat. No. 3,093,560 teaches the polymerization of formaldehyde per se.

In summary this invention is directed to a method for preparing a high molecular weight polyoxymethylene comprising:

(a) Compacting trioxane in the solid state (without melting the trioxane), said trioxane having a bulk density of about 0.70–0.75 gram per cm.$^3$, into a self-coherent mass having a bulk density of about 1.00–1.40 grams per cm.$^3$ by subjecting said trioxane to a pressure of about 200–50,000 p.s.i. while maintaining said trioxane in the solid state at a temperature of about 0–62° C.;

(b) Subjecting the compacted trioxane, in the solid state, to high energy ionizing radiation at the rate (i.e., a total dose) of about 0.01–10 megarads while maintaining the temperature of the compacted trioxane at about 0–62° C. to form activated polymerization sites within the solid trioxane;

(c) Maintaining the irradiated trioxane at a temperature above about 30° C. for about 0.02–2 days to permit polymerization of the irradiated trioxane to form high molecular weight polyoxymethylene product (if the radiation is conducted above about 30° C. the radiation time is included in the 0.02–2 days);

(d) Separating the high molecular weight polyoxymethylene product, said product having a reduced specific viscosity of about 0.5–3.0 deciliters per gram, when determined at 135° C. using 0.1 gram of said product in 100 ml. of gamma butyrolactone solvent, a melting point within the range of about 185–190° C., and a density within the range of 1.45–1.50 grams per cm.$^3$, from non-polymerized trioxane (in other words, the separated high molecular weight polyoxymethylene is in a compacted condition (or state) when separated and without pressing or otherwise compacting subsequent to the aforementioned irradiation step); and (e) Recovering the separated polyoxymethylene.

In preferred embodiments of the process described in the above summary:

(1) The compacted trioxane is maintained in a sealed system in the presence of an inert atmosphere while being subjected to radiation;

(2) The sealed system in which the solid trioxane is irradiated contains substantially no free space (this means that the container in which the trioxane is irradiated and polymerized is substantially filled with trioxane and that trioxane is packed into the container in a manner to avoid the formation of voids (or spaces) between the trioxane particles and that there is substantially no void (or space) between the top of the trioxane and the top of the container. In other words there is an absence of space in which vapor can accumulate);

(3) The irradiated trioxane is maintained in a sealed system at a temperature above 30° C. for about 0.02–2 days;

(4) The sealed system in which irradiated solid trioxane is polymerized contains substantially no free space;

(5) The irradiated trioxane is maintained in the solid state at a temperature of about 31–62° C. for about 0.2–2 days;

(6) The irradiated solid trioxane is maintained in the solid state at about 50–62° C. to permit polymerization of said trioxane to occur; and (7) The high molecular weight polyoxymethylene product is separated from non-polymerized trioxane by extracting the trioxane with a solvent.

It is well known that formaldehyde and low molecular weight formaldehyde polymers may be polymerized to form high molecular weight polyoxymethylene polymers by using either cationic or anionic chemical polymerization initiators. More recently, it has been found that high quality polyoxymethylene polymers may be obtained by polymerizing trioxane with high energy ionizing radiation.

An irradiation polymerization process possesses an inherent advantage over chemical polymerization processes in that no chemical polymerizing catalyst is incorporated in the reaction mixture which must subsequently be removed or neutralized by complex and expensive washing and extraction procedures. Furthermore, when polyoxymethylene polymers are prepared by irradiating trioxane, unreacted trioxane monomer may be conveniently and economically retrieved in a substantially uncontaminated form from further treatment by merely distilling or solvent extracting the non-polymerized trioxane from the thus formed reacted mixture. It is also found in some cases that polyoxymethylene polymers produced by irradiation possess a higher degree of crystallinity and/or orientation than the polymers produced by corresponding prior art chemical processes.

While irradiation polymerization processes possess advantages over prior art chemical polymerization processes, it is sometimes found in the irradiation polymerization of commercial particulate trioxane that seemingly identical conditions of irradiation and polymerization will produce polymers having properties which will vary from batch to batch. Furthermore, it is sometimes found that when irradiation polymerization of particulate trioxane is carried out on a relatively large scale, the overall yield of polymer and reduced specific viscosity are not always consistent.

It is therefore an object of the present invention to provide an improved method for producing high molecular weight polyoxymethylene by irradiation polymerization of trioxane.

It is another object to provide a method by which polyoxymethylene polymers having a molecular weight falling in a desirable range may be consistently and efficiently produced by irradiating trioxane with high energy ionizing irradiation.

It is still another object to provide a method by which consistently high yields of polyoxymethylene polymer may be obtained by polymerizing trioxane using high energy ionizing irradiation as the polymerizing initiator.

These and still further objects of the present invention will become readily apparent to one skilled in the art in the following detailed description and specific examples.

In general the present invention contemplates an improved method for producing high molecular weight polyoxymethylene by irradiation of trioxane which comprises contacting normal particulate commercially available trioxane to as high a degree as possible to effectively reduce the exposed surface area thereof, irradiating in the solid state the compacted trioxane with high energy ionizing irradiation to create activated polymerization sites therein, polymerizing the irradiated trioxane by heating to temperatures in excess of about 30° C. to achieve a desired degree of polymerization, and removing nonpolymerized trioxane from the resulting polyoxymethylene polymers. Added benefits in the form of still higher yields and molecular weight are otained in the above process if during the polymerization step the irradiated trioxane is confined in a polymerization zone in a manner that substantially eliminates any free space around the trioxane and thereby substantially prevents or minimizes the formation of a trioxane gaseous phase in contact with the irradiated material.

Commercial trioxane as it is normally prepared and shipped as a staple article of commerce is a white particulate solid which according to the mode of its packing and particle size distribution has a bulk density of about 0.70 to about 0.75 gram per cm.$^3$. When this particulate trioxane is subjected in the particulate state to irradiation polymerization, it is frequently found that inconsistent results are obtained with respect to both yield and molecular weight of various batches of the resultant polymer. We have found that if loose particulate commercial trioxane is first compacted into a dense self-coherent mass before irradiation, the resultant polymer will be obtained in consistently high quality and yield.

Compaction of the particulate trioxane is done by compressing particulate trioxane under pressures in excess of about 100 p.s.i. to form a coherent block or pellet of trioxane.

Subsequently to compacting, i.e., reducing the bulk volume and therefore reducing the exposed surface area of the particulate trioxane, the trioxane is subjected to from about 0.001 to about 10 megarads of high energy ionizing irradiation in the solid state to induce activated polymerization sites therein. The temperature at which the irradiation is applied is above about 0° C. and below about 62° C., which is the melting point of the trioxane monomer, due to the fact the irradiation in the liquid state does not produce the activated sites required to initiate the polymerization. If irradiation is conducted at below about 30° C., it is found that activated sites are induced in the trioxane mass but substantially no polymerization occurs. In such a case, the irradiated trioxane is heated to above 30° C. to achieve the desired degree of polymerization. In the alternative, irradiation may be applied to the trioxane mass at a temperature above about 30° C. and below about 62° C. whereupon polymerization will occur simulaneously with irradiation and then, if desired aging can be continued below the melting point of the monomer.

As indicated above, subsequent to irradiation the trioxane is subjected to a temperature in excess of about 30° C. to cause polymerization of the trioxane. The maximum temperatures used to induce polymerization are those which are below the melting point of trioxane. Furthermore, it is found that if the crystalline structure of the original trioxane is to influence the final polymer, the polymerization must be carried out at a temperature below the melting point of the trioxane. To obtain a highly crystalline polyoxymethylene polymer, it is therefore found that polymerization temperatures must be lower than about 62° C. and preferably in the range of from about 55–62° C. at which the optimum rate of polymerization appears to occur when the trioxane is maintained in the solid state.

The compacting step contemplated herein will convert the commercially available particulate trioxane, which has a normal bulk density of from about 0.70 to about 0.75 gram per cm.$^3$, into a self-coherent mass having a density of from about 1.00 to about 1.40 grams per cm.$^3$. The density of a compacted trioxane which has been compacted using external pressure of from about 200 to about 50,000 pounds per inch$^2$ has been found to possess a density of from about 1.00 to about 1.40 grams per cm.$^3$.

Subsequent to compacting, the trioxane mass is subjected in the solid state to from about 0.001 to as high as about 10 megarads of high energy ionizing irradiation. The irradiation which is used to induce polymerization of the trioxane may be any high energy radiation which will form activated polymerization sites within the solid trioxane mass. Ionizing radiations such as high energy eletrons, protons, neutrons, gamma-rays, and X-rays which are emitted from either radioactive isotopes or generated by appropriate apparatus may be used with advantage.

The irradiation is delivered at a rate and under conditions which will permit the trioxane to remain in the solid state. Hence, while as much as 10 megarads of irradiation may be used in the practice of the present invention, the desire to obtain high molecular weight material may require that somewhat less irradiation be used. It is found that in many instances dosages in the range below about 5 megarads, and preferably 2 megarads, may be used with practical advantage.

Subsequent to irradiation as mentioned above, the trioxane mass is maintained at a temperature in excess of about 30° C. for a time suffient to permit the desired degree of polymerization to occur. Generally speaking when irradiation dosages in the ranges of 0.001 to 10 megarads, and polymerization temperatures ranging from about 31° C. to about 62° C. are used, it is found that polymerization periods of from about 0.02 to about 2.0 days will produce up to about 80% conversion to polymer.

It is generally preferred that both irradiation and polymerization of the trioxane to be carried out in a sealed system and in the presence of an inert atmosphere such as nitrogen, argon, helium, or in a vacuum. While the invention may be practiced in an open system with considerable success, it is found that a closed system will prevent the escape of trioxane vapor as well as keep foreign matter from contaminating the system.

A slightly different preferred embodiment of the invention involves modifying the above specified conditions under which polymerization is carried out. It is found that if the polymerization of the irradiated trioxane is conducted in a zone that eliminates as much free space from around the trioxane as possible, a considerable increase in molecular weight is obtained as compared to a sample polymerized under similar conditions but in the presence of free space. This elimination of free space minimizes the formation of a trioxane gaseous phase which is in equilibrium with the solid trioxane during processing. In view of the fact trioxane must be in the solid phase to effect polymerization by the method contemplated herein, any trioxane which converts to the gas phase is "lost" from the standpoint of polymerization. As will be shown in our examples, the preventing or minimizing of the volume available for gas formation by the restriction of "free space" in the trioxane container will substantially enhance the molecular weight of the polymer. Elimination of free spaces around the polymer may be achieved by filling a trioxane vessel, which is used to contain the trioxane throughout the process, as full as possible with trioxane which has been compressed to a high degree using external pressure. Furthermore, treatment of particulate trioxane in a confined space is contemplated. The container containing the compressed particulate trioxane is constructed of material which is both reasonably transparent to the polymerization inducing irradiation and which is strong enough to withstand the force exerted by the vapor pressure of the trioxane during the processing if hermetically sealed.

After polymerization of the trioxane mass has been completed, using either the compaction process alone or in combination with restricting of free space, the reaction mixture is treated to remove non-polymerized trioxane. This may be conveniently done by distilling the trioxane from the reaction mixture under conditions of temperature and/or reduced pressure that will cause vaporization of the free trioxane from the mass. Alternatively, the non-polymerized trioxane may be removed from the reaction mixture by extraction with suitable solvents such as water, methanol acetone, etc.

The polyoxymethlylene polymers obtained in the practice of the present invention are characterized by possessing a reduced specific viscosity of from about 0.5 to about 3.0 deciliters per gram when determined at 135° C. using 0.1 gram of polymer in 100 ml. of gamma butyrolacetone solvent. The polymers possess melting points of from about 185 to about 190° C., and a density in the range of 1.45 to 1.50.

Having described the essential elements of the present invention, the following detailed specific examples are given to illustrate specific embodiments thereof.

EXAMPLE I

For use in the following example two samples of commercial particulate trioxane were obtained and analyzed with respect to particle size distribution. The particle size distribution of the samples were determined to be as follows:

| | Batch I, percent | Batch II, percent |
|---|---|---|
| Particle diameter, microns: | | |
| 4,000+ | 0.0 | 0.0 |
| 2,000+ | 6.8 | 2.0 |
| 840+ | 42.6 | 33.8 |
| 500+ | 30.0 | 43.9 |
| 420+ | | 6.4 |
| 350+ | 9.6 | |
| 250+ | 5.9 | 11.1 |
| 250− | 5.4 | 2.1 |

To establish a standard with respect to irradiating particulate trioxane, samples of both batch I and II mentioned above were irradiated to various dosages using 2 mev. electrons produced by a Van de Graaff generator. The irradiated samples were then placed in 250 cc. bottles for heating (polymerization at 55° C. for five hours. The results obtained are tabulated below.

| | Dose, mr. | Sample wt., g. | Conversion, percent | RSV, dl./g. |
|---|---|---|---|---|
| Batch: | | | | |
| I | 0.1 | 150.6 | 30.2 | 1.37 |
| II | 0.1 | 168.4 | 28.1 | 0.98 |
| I | 0.3 | 168.4 | 39.2 | 1.34 |
| II | 0.3 | 179.4 | 30.5 | 1.05 |
| I | 0.5 | 167.6 | 40.7 | 1.35 |
| II | 0.5 | 164.4 | 32.8 | 0.97 |

EXAMPLE II

To illustrate the effectiveness of compacting using external pressure, samples of commercial particulate trioxane similar to those described above were compressed under a pressure of 51,000 p.s.i. into 1″ diameter circular discs having a thickness of 0.8 to 1.0 cm., an approximate weight of 7 grams and an approximate bulk density of 1.39. The monomer discs were then irradiated to 0.3 megarad in air, and aged in 74 cc. bottles at 55° C. for five hours. The effect of compacting monomer using external pressure is clearly indicated in the data tabulated below:

| | Monomer condition | Conversion, percent | RSV, dl./g. |
|---|---|---|---|
| Run: | | | |
| 1 | Noncompacted | 30.2 | 0.70 |
| 2 | do | 31.0 | 0.66 |
| 3 | Compacted | 42.4 | 1.45 |
| 4 | do | 41.7 | 1.41 |
| 5 | do | 43.6 | 1.38 |
| 6 | do | 41.8 | 1.50 |

It is seen in the above that a substantial increase in both polymer yield and RSV is obtained by compacting the particulate monomer under a pressure.

EXAMPLE III

To illustrate the effect of free space in a polymerization zone on molecular weight conversion, varying amounts of particulate trioxane were placed in 250 cc. bottles. Some of these samples were compacted by application of external pressure, and others were left in the original particulate state. The samples were irradiated to 0.3 megarad with 2 mev. electrons in air and subsequently aged (polymerized) for varying times at 55° C. The results of placing varying amounts of trioxane in the 250 cc. bottles are tabulated in the table below:

| Run | Monomer condition | Amount monomer in bottle, g. | Aging period, hours | Conversion, percent | RSV, dl./g |
|---|---|---|---|---|---|
| 1 | Noncompacted | 160 | 0.5 | 22.3 | 0.97 |
| 2 | do | 160 | 1.0 | 30.3 | 1.17 |
| 3 | do | 160 | 2.0 | 37.8 | 1.38 |
| 4 | do | 160 | 5.0 | 46.8 | 1.55 |
| 5 | do | 40 | 0.5 | 25.4 | 0.92 |
| 6 | do | 40 | 1.0 | 28.4 | 0.95 |
| 7 | do | 40 | 2.0 | 35.1 | 1.09 |
| 8 | do | 40 | 5.0 | 43.1 | 0.73 |
| 9 | Compacted | 160 | 0.5 | 13.6 | 0.90 |
| 10 | do | 160 | 1.0 | 27.4 | 0.99 |
| 11 | do | 160 | 2.0 | 35.1 | 1.34 |
| 12 | do | 160 | 4.0 | 47.3 | 1.35 |
| 13 | do | 40 | 0.5 | 22.5 | 0.96 |
| 14 | do | 40 | 1.0 | 40.3 | 0.72 |
| 15 | do | 40 | 2.0 | 41.2 | 0.86 |
| 16 | do | 40 | 4.0 | 51.0 | 1.08 |

It is seen from the above data that when larger amounts of either noncompacted or compacted trioxane are confined in a given space to give less free space around the monomer and hence minimize trioxane gas phase formation, the molecular weight (as expressed in terms of RSV) of the resultant polymer is increased.

EXAMPLE IV

To illustrate the effect of increasing the bulk density of trioxane on the molecular weight of the final polymer, a series of samples were compacted to various densities, and subsequently irradiated and polymerized under identical conditions. An irradiation dose of 0.3 megarad applied at room temperature using 2 mev. electrons was used. Polymerization was carried out for 5 hours at 55° C. The results of several runs are tabulated below:

| Monomer state | Bulk density, g./cm.$^3$ | Conversion, percent | RSV, dl./g |
|---|---|---|---|
| Noncompacted | 0.70 | 40.6 | 0.88 |
| Compacted with a pressure of: | | | |
| 1,300 p.s.i. | 1.35 | 41.4 | 1.45 |
| 10,000 p.s.i. | 1.39 | 43.1 | 1.56 |
| 32,000 p.s.i. | 1.40 | 41.3 | 1.57 |
| 51,000 p.s.i. | 1.40 | 42.0 | 1.58 |

From the above specific examples, it is clearly seen that consistently high yields of higher molecular weight polyoxymethylene polymer may be obtained by compacting the monomer to reduce its surface area. It is also seen that conducting the polymerization in the presence of as small amount of free space as possible gives a higher molecular weight polymer.

As used herein, the term "percent (%)" means parts per hundred by weight unless otherwise defined where used, and the term "pounds per inch$^2$ (p.s.i.)" means pounds per square inch gauge pressure.

We claim:

1. A method for preparing high molecular weight polyoxymethylene polymer comprising:
   (a) compacting trioxane in the solid state, said trioxane having a bulk density of about 0.70–0.75 gram per cm$^3$, into a self-coherent mass having a bulk density of about 1.00–1.40 grams per cm.$^3$ by subjecting said trioxane to a pressure of about 200–50,000 p.s.i. while maintaining said trioxane in the solid state at a temperature of about 0–62° C.
   (b) subjecting the compacted trioxane, in the solid state, to high energy ionizing radiation at the rate of about 0.01–10 megarads while maintaining the temperature of the compacted trioxane at about 0–62° C. to form activated polymerization sites within the solid trioxane;
   (c) maintaining the irradiated trioxane at a temperature above about 30° C. for about 0.02–2 days to permit polymerization of the irradiated trioxane to form high molecular weight polyoxymethylene product;
   (d) separating the high molecular weight polyoxymethylene product, said product having a reduced specific viscosity of about 0.5–3.0 deciliters per gram, when determined at 135° C. using 0.1 gram of said product in 100 ml. of gamma butyrolactone solvent, a melting point within the range of about 185–190° C., and a density within the range of 1.45–1.50 grams per cm.$^3$, from nonpolymerized trioxane; and
   (e) recovering the separated polyoxymethylene.

2. The method of claim 1 in which the compacted trioxane is maintained in a sealed system in the presence of an inert atmosphere while being subjected to radiation.

3. The method of claim 2 wherein the sealed system in which the solid trioxane is irradiated contains substantially no free space.

4. The method of claim 1 in which the irradiated trioxane is maintained in a sealed system at a temperature above 30° C. for about 0.02–2 days.

5. The method of claim 4 wherein the sealed system in which the irradiated solid trioxane is polymerized contains substantially no free space.

6. The method of claim 1 in which the irradiated trioxane is maintained in the solid state at a temperature of about 31–62° C. for about 0.2–2 days.

7. The method of claim 1 in which the irradiated solid trioxane is maintained in the solid state at about 50–62° C. to permit polymerization of said trioxane to occur.

8. The method of claim 1 in which the high molecular weight polyoxymethylene product is separated from nonpolymerized trioxane by extracting the trioxane with a solvent.

References Cited
UNITED STATES PATENTS

| | | | |
|---|---|---|---|
| 2,947,727 | 8/1960 | Bartz | 260—67 |
| 3,027,352 | 3/1962 | Walling et al. | 260—67 |
| 3,093,560 | 6/1963 | Fourcade | 204—159.21 |

MURRAY TILLMAN, Primary Examiner

R. B. TURER, Assistant Examiner

U.S. Cl. X.R.

260—67